(12) United States Patent
Shimada

(10) Patent No.: US 6,563,548 B1
(45) Date of Patent: May 13, 2003

(54) INTERLACE NOISE FILTER

(76) Inventor: Atsuo Shimada, at Techno Link Co., Ltd. of 8-12, Ariakeohhashi-cho, Niigata-shi, Niigata-ken (JP)

( * ) Notice: Subject to any disclaimer, the term of this patent is extended or adjusted under 35 U.S.C. 154(b) by 0 days.

(21) Appl. No.: 09/354,483

(22) Filed: Jul. 16, 1999

(30) Foreign Application Priority Data

Sep. 18, 1998 (JP) .......................................... 10-264880

(51) Int. Cl.⁷ ............................................... H04N 5/21
(52) U.S. Cl. ........................ 348/607; 348/607; 348/618; 375/240.19; 382/277
(58) Field of Search ................................ 348/607, 470, 348/612, 613, 618, 619, 622, 624, 629, 683, 429.1–440.1; 375/240.18, 240.19, 240.29; 382/240, 276, 277, 300; H04N 5/21

(56) References Cited

U.S. PATENT DOCUMENTS

| | | | | |
|---|---|---|---|---|
| 5,790,694 A | * | 8/1998 | Maruo | 382/149 |
| 5,909,518 A | * | 6/1999 | Chui | 382/277 |
| 6,163,619 A | * | 12/2000 | Maruo | 382/141 |
| 6,178,269 B1 | * | 1/2001 | Acharya | 382/277 |
| 6,263,120 B1 | * | 7/2001 | Matsuoka | 382/300 |
| 6,310,972 B1 | * | 10/2001 | Li et al. | 382/232 |
| 6,380,985 B1 | * | 4/2002 | Callahan | 348/607 |

FOREIGN PATENT DOCUMENTS

JP   10-93440   10/1998

OTHER PUBLICATIONS

Patent Application Publication US 2002/0006229, Chao et al., Jan. 17, 2002, 382/240.*
Patent Application Publication US 2002/0057736, Fuji et al., May 16, 2002, 375/240.*

* cited by examiner

Primary Examiner—John Miller
Assistant Examiner—Brian Yenke
(74) Attorney, Agent, or Firm—Quarles & Brady LLP

(57) ABSTRACT

An interlace noise filter which can obtain a high resolution still image from an interlace motion picture. An original image either in an even number field or in an odd number field is sampled by a sampling means (1) along only the horizontal direction of the original image. Then, it is Haar wavelets transformed. Thereafter, the gradation change of the original image is enlarged by a reconstituting means (3), while interpolating unsampled original image with sub pixel accuracy.

16 Claims, 3 Drawing Sheets

INTERLACE NOISE FILTER

BACKGROUND OF THE INVENTION

1. Field of the Invention

The present invention relates to an interlace noise filter which enables the obtaining of a high resolution still image from an interlace motion image.

2. Prior Art

Scanning system for television is generally called an interlace system. In Japan, for example, 525 scan lines are first scanned every other scan line, thereby forming one original image in the odd number field, then respective scan lines between the first scanned scan lines are scanned, thereby forming the other original image in the even number fields. In other words, an entire original image is transmitted through twice scanning. The interlace system is advantageous in that it can present less flickers and more smooth images. If the number of images transmitted for one second (simply called the number of transmission images) is relatively small, a motion picture thus obtained becomes unnatural, and thus, the number has been set to 30 images per one second. Accordingly, the scanning of one image (frame scanning) takes 1/30 sec., and thus one scanning operation according to interlace system is performed in 1/60 sec.

According to interlace system, whilst a motion picture is not visually affected in particular, print-out or motion-stop of video images or the like on a television screen is adversely affected such that two images displaced by 1/30 sec. are displayed or printed out with the former image being shifted relative to the latter, so that an entire image thus obtained becomes so hard to make out. This is particularly true of a picture of a relatively quick motion. On the other hand, if print-out or motion-stop is carried out, using an image through the first image scanning only (i.e., an original image either in the odd number field or in the even number field) in order to prevent the images from being shifted, there are problems that the resulting image would become too rough to see, and some colors would be dropped out due to the output of gradation in the odd or even number field only.

SUMMARY OF THE INVENTION

To eliminate the above-mentioned problems, it is, therefore, an object of the present invention to provide an interlace noise filter which enables a high resolution still image to be obtained from a motion picture according to interlace system.

To attain the above objects, there is proposed an interlace noise filter which comprises: a sampling means for sampling an original image in an even number field out of an interlace original image; a transforming means for Haar wavelets transformation of sampled image data; a reconstituting means for constructing new image data through an inverse transformation of the Haar wavelets transformed data; and an output means for outputting thus reconstituted new image data together with an original image in an odd number field.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DETAILED DESCRIPTION OF THE INVENTION

Hereinafter is explained an embodiment of the invention with reference to the attached drawings.

Figure 1:
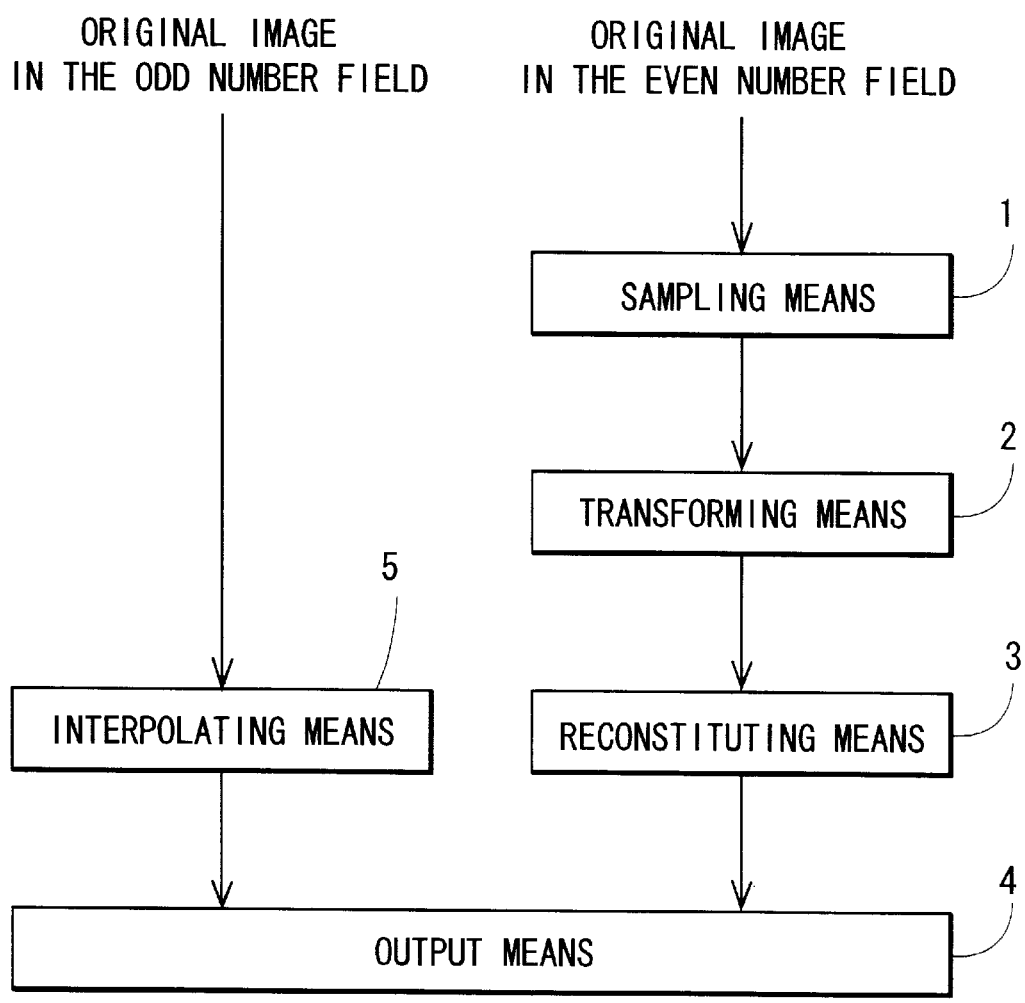
FIG. 1 is a schematic flow chart showing an overall structure of an interlace noise filter in accordance with an embodiment of the invention.

Referring to FIG. 1, reference numeral 1 designates a sampling means for sampling an original image in the even number field only out of that which is scanned according to interlace system. Image data corresponding to the original image in the even number field sampled by the sampling means 1 are Haar wavelets transformed by a transforming means 2. What is called "Haar wavelets transformation" is wavelets transformation using the Haar base, said Haar base having linear phase characteristic, giving orthonormal wavelets transformation.

Reference numeral 3 designates a reconstituting means for constituting new image data obtained through the inverse Haar wavelets transformation of the image data transformed by the transforming means 2. The new image data reconstituted by the reconstituting means 3 are outputted to an output means 5 for output of a still image.

In the original image scanned according to interlace system, the original image in the odd number field which is not sampled by the said sampling means 1, is outputted to the output means 4, either without being Haar wavelets transformed, or through an interpolating means 5. The following discussion assumes that an interlace noise filter of the invention comprises this interpolating means 5, which is to interpolate the original image in the odd number field with sub pixel accuracy. The output means 4 is structured so that new image data corresponding to the even number field which are constituted by the said reconstituting means 3 may be outputted together with the image data obtained through the interpolation by the interpolating means 5.

Figure 2:
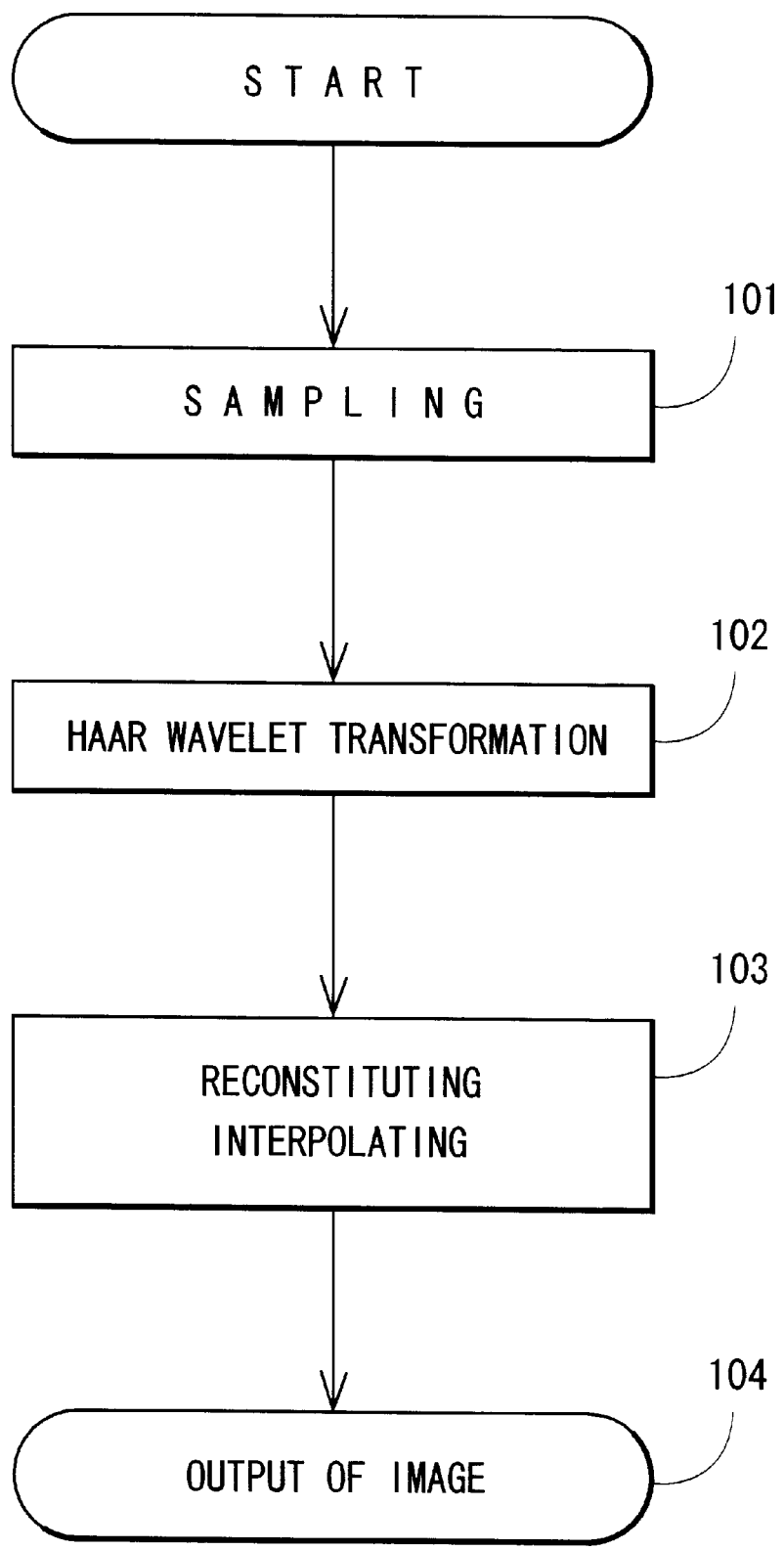
FIG. 2 is another flow chart showing a processing sequence of an interlace noise filter of FIG. 1.

Next, a processing sequence of the image data is explained with reference to FIG. 2.

First, an original image in the even number field at a specific time is sampled by the sampling means 1 out of the original image which is to be scanned according to interlace system, as denoted by numeral 101. Television scanning is normally defined in the horizontal direction, and thus the original image is sampled along only the horizontal direction accordingly. In other words, the original image in the even number field is sampled along the scanning direction.

According to conventional devices, when sampling an original image, applying Haar wavelets transformation to image processing, sampling is first performed in the horizontal direction and values after the transformation are kept, and then another sampling is performed in the vertical direction for further transformation. According to the invention, however, no sampling is performed in the vertical direction, and thus the amount of image data to be sampled is able to be reduced to as small as 25% of an entire original image. Specifically, as interlace system constructs an original image along the scanning direction, the sampling of the original image in the even number field along the same scanning direction through the sampling means 1, would make it possible to perform the sampling operation substantially simultaneously with the pickup of the original image. Sampling in the above manner would realize the high speed sampling as well as high speed processing of an entire image, including hereinafter described transforming, reconstituting and outputting processing.

Secondly, the image data sampled by the sampling means 1 are Haar wavelets transformed by the transforming means 2, as denoted by numeral 102. In other words, the image data sampled are divided into high frequency components and low frequency components, and then are encoded, through the Haar wavelets transformation. More specifically, the sampled data are Haar wavelets transformed in units of eight blocks designated as symbol a through symbol h which are arranged along the horizontal (scanning) direction. This block dividing is carried out in the horizontal direction only, in an non-interleave manner, thereby realizing high speed processing. In addition, the transformation is carried out relative to respective color tones of red (R), green (G) and blue (B).

Figure 3:
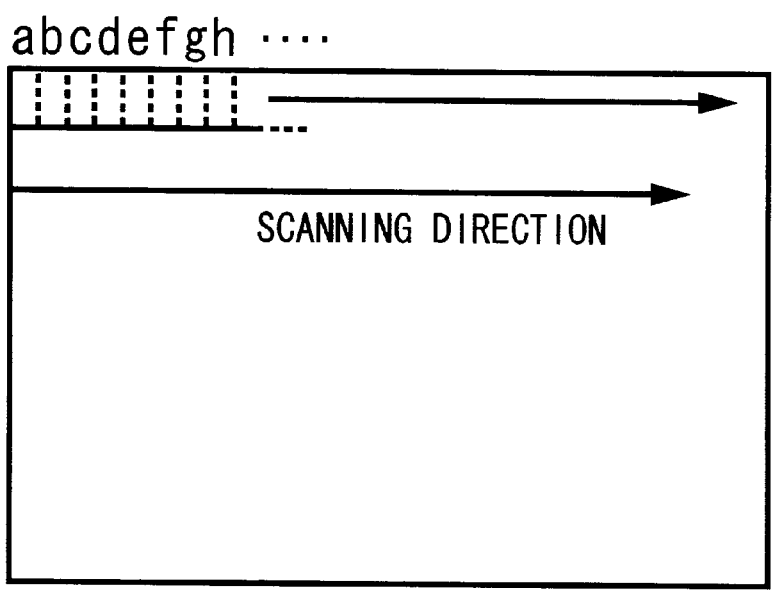
FIG. 3 is a block diagram explaining an block dividing employed for an interlace noise filter of FIG. 1.
Figure 4:
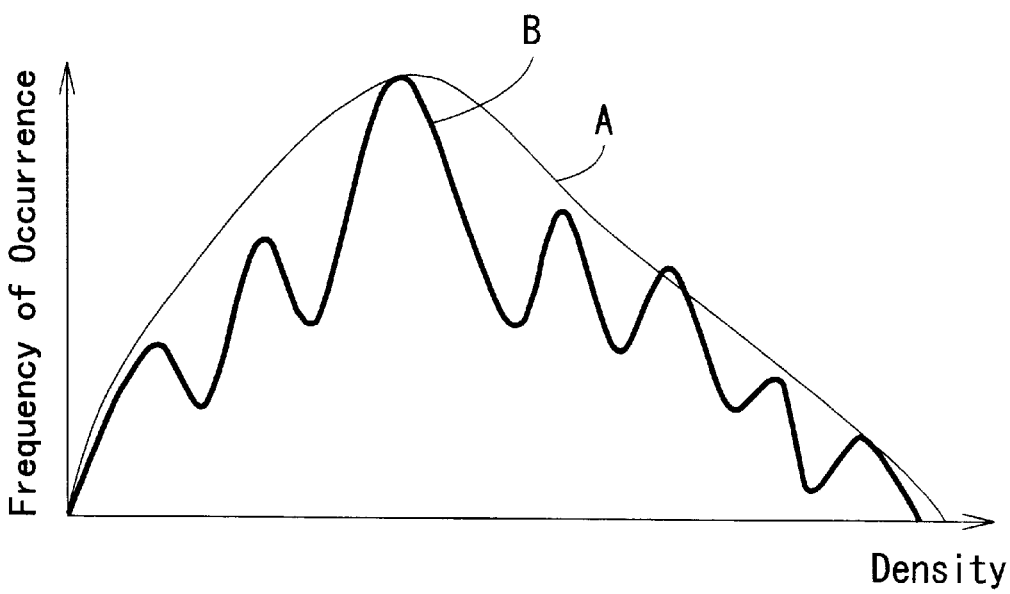
FIG. 4 is a graph showing a density to frequency of occurrence relationship between an original image and a processed image according to the invention.

Subsequently, the image data which are Haar wavelets transformed by the transforming means 2 are reconstituted or inverse Haar wavelets transformed by the reconstituting means 3, as denoted by numeral 103. Through this reconstitution, an interpolation processing is carried out so as to enlarge the gradation change of density to emphasize the edge of the image (i.e., contrast), thereby obtaining new image data capable of being visually recognized by human as high resolution picture. In other words, the intermediate components are filtered through the inverse transformation of the image data encoded by the transforming means 2, so that the new image data of larger gradation change, having a density distribution like curve B of FIG. 4, are constructed from the original image data, having a density distribution like curve A in FIG. 4, where density of image data is taken in X axis while frequency of occurrence (i.e., the number of pixels) in Y axis, Taking natural image data as an example, the result of transformation processing in units one block (see FIG. 3) is shown by the following table 1:

TABLE 1

| Gradation before the processing | Gradation after the processing |
| --- | --- |
| 104 | 103 |
| 96 | 96 |
| 64 | 63 |
| 88 | 87 |
| 160 | 159 |
| 192 | 191 |
| 192 | 191 |
| 200 | 200 |

As is apparent from the table 1, it is noted that the respective image data tend to be processed to the same gradation tone in relatively high gradation range, while they tend to be processed to lower gradation tone in relatively low gradation range, whereby an image of great contrast with larger gradation change is obtained.

On the other hand, the un-sampled original image in the odd number field is interpolated with sub pixel accuracy by the interpolating means 5, as denoted by numeral 103. In this way, an image of more natural gradation change is obtained by the interpolation with sub pixel accuracy between the odd number field and the even number field. Thus, the image data interpolated by the interpolating means 5 are arranged in the manner that fills the intervals of the new image data reconstituted by the reconstituting means 3, corresponding to the even number field, whereby an entire image is outputted by the output means 4, as denoted by numeral 104. A still image thus obtained can be visually recognized as high resolution picture by human beings.

According to the foregoing embodiment of the invention, an interlace noise filter of the invention comprises the sampling means 1 for sampling an original image in the even number field out of the original entire image according to interlace system, the transforming means 2 for Haar wavelets transformation of the sampled image data, the reconstituting means 3 for constituting new image data through the inverse transformation of the image data that are Haar wavelets transformed, and the output means 4 for outputting thus reconstituted new image data along with the original image in the odd number field which are not sampled by the sampling means 1.

Specifically, only the original image in the even number field is sampled out of the original image according to interlace system, and then, the image data thus sampled are Haar wavelets transformed, which are further re-transformed by the reconstituting means 3. For the higher gradation range of the new image data thus obtained, the image data tend to be so processed that they remain the same gradation, while for the lower gradation range thereof, they tend to be so processed that the gradation may become still lower as the gradation becomes low, whereby the whole image becomes greatly contrasted, having larger gradation change as compared to the original image prior to the transformation. Accordingly, if the new image data thus processed are outputted together with the un-sampled original image in the odd number field, then the displacement of images between in the even number field and in the odd number field can be interpolated, without dropping out the number of colors, so that a high resolution static picture without the displaced images (or interlace components) due to interlace system can be obtained.

Further, it should be noted that in the foregoing embodiment, the sampling means 1 carries out the sampling of the original image in the even number field along the scanning direction. In this case, as the sampling means 1 does not perform vertical sampling of the image in the even number field, the amount of image data to be sampled is drastically reduced relative to that of the original entire image data. Furthermore, as interlace system constructs an original image along the scanning direction, and therefore, if the original image in the even number field, for example, is sampled along the same scanning direction by means of the sampling means 1, then the sampling means 1 is capable of performing the sampling processing substantially simultaneously with the pickup of the original image. Thus, the processing time in obtaining new image data can be shortened.

Also, an interlace noise filter of the embodiment further comprises the interpolating means 5 for interpolating the un-sampled original image in the odd number field with sub pixel accuracy, while the output means 4 is so structured that the new image data reconstituted by the reconstituting means 3 may be outputted together with the image data which are interpolated by the interpolating means 5. As the original image in the odd number field which remains unsampled by the sampling means 1 goes through the interpolation processing with sub pixel accuracy, the output from the output means 4 of the image data which have gone through the interpolation processing together with the new image data reconstituted by the reconstituting means 3, enables you to obtain a picture with more natural gradation change between both images.

Although an interlace noise filter of the invention is basically to obtain a high resolution still picture from a motion picture according to interlace system, when you stop or print out a motion image, such as video image, on a television screen, it can be advantageously used for other purposes as well. For security system, for example, the amount of information required therefor would suffice if one to three still images are obtained per one second, and thus the transmission of still images from the output means 4 at intervals of preset time, instead transmiting a motion picture, can drastically reduce the amount of image data to be transmitted, at the same time that a high resolution still image free from the displaced images inherent to interlace system can be obtained. Likewise, the invention is also applicable to the field of visual telephone, thereby realizing the transmission of a high resolution still image free from the displaced images inherent to interlace system. In addition, electronic shutters are no longer necessary for cameras, according to the invention.

Incidentally, the present invention should not be limited to the foregoing embodiment, but may be modified within the scope of the invention. For example, although the original image in the even number field only are sampled in the foregoing embodiment, the one in the odd number field only may be sampled. In that case, the original image in the even number field is outputted to the output means 4 either without sampling or through the interpolating means 5.

What is claimed:

1. An interlace noise filter which comprises:
   a sampling means (1) for sampling an original image in an even number field out of an interlace original image;
   a transforming means (2) for Haar wavelets transformation of sampled image data;
   a reconstituting means (3) for constructing new image data through an inverse transformation of the Haar wavelets transformed data; and
   an output means (4) for outputting thus reconstituted new image data together with an original image in an odd number field.

2. An interlace noise filter according to claim 1, wherein said sampling means (1) performs the sampling of an original image in an even number field along a scanning direction.

3. An interlace noise filter according to claim 2, further comprising an interpolating means (5) for interpolating an original image in an odd number field with sub pixel accuracy,
   wherein said output means (4) outputs the new image data reconstituted by said reconstituting means (3) together with an original image in an odd number field which has gone through the interpolation processing by said interpolating means (5).

4. An interlace noise filter according to claim 2, wherein said transforming means (2) performs Haar wavelets transformation in units of plural blocks arranged along a scanning direction relative to the sampled image data.

5. An interlace noise filter according to claim 1, further comprising an interpolating means (5) for interpolating an original image in an odd number field with sub pixel accuracy,
   wherein said output means (4) outputs the new image data reconstituted by said reconstituting means (3) together with an original image in an odd number field which has gone through the interpolation processing by said interpolating means (5).

6. An interlace noise filter according to claim 1, wherein said transforming means (2) divides the sampled image data into high frequency components and low frequency components, which are then encoded through Haar wavelets transformation.

7. An interlace noise filter according to claim 1, wherein said transforming means (2) performs Haar wavelets transformation of the sampled image data with respect to respective color tones of red (R), green (G) and blue (B).

8. An interlace noise filter according to claim 1, wherein said reconstituting means (3) performs the filtering of intermediate components through an inverse transformation of the image data which are Haar wavelets transformed by said transforming means (2), so that new image data of greater gradation change may be reconstituted.

9. An interlace noise filter which comprises:
   a sampling means (1) for sampling an original image in an odd number field out of an interlace original image;
   a transforming means (2) for Haar wavelets transformation of sampled image data;
   a reconstituting means (3) for constructing new image data through an inverse transformation of the Haar wavelets transformed data; and
   an output means (4) for outputting thus reconstituted new image data together with an original image in an even number field.

10. An interlace noise filter according to claim 9, wherein said sampling means (1) performs the sampling of an original image in an odd number field along a scanning direction.

11. An interlace noise filter according to claim 10, further comprising an interpolating means (5) for interpolating an original image in an even number field with sub pixel accuracy,
    wherein said output means (4) outputs the new image data reconstituted by said reconstituting means (3) together with the original image in an even number field which has gone through the interpolation processing by said interpolating means (5).

12. An interlace noise filter according to claim 10, wherein said transforming means (2) performs Haar wavelets transformation in units of plural blocks arranged along a scanning direction relative to the sampled image data.

13. An interlace noise filter according to claim 9, further comprising an interpolating means (5) for interpolating an original image in an even number field with sub pixel accuracy,
    wherein said output means (4) outputs the new image data reconstituted by said reconstituting means (3) together with an original image in an even number field which has gone through the interpolation processing by said interpolating means (5).

14. An interlace noise filter according to claim 9, wherein said transforming means (2) divides the sampled image data into high frequency components and low frequency components, which are then encoded through Haar wavelets transformation.

15. An interlace noise filter according to claim 9, wherein said transforming means (2) performs Haar wavelets transformation of the sampled image data with respect to respective color tones of red (R), green (G) and blue (B).

16. An interlace noise filter according to claim 5, wherein said reconstituting means (3) performs the filtering of intermediate components through an inverse transformation of the image data which are Haar wavelets transformed by said transforming means (2), so that new image data of greater gradation change may be reconstituted.

* * * * *

UNITED STATES PATENT AND TRADEMARK OFFICE
CERTIFICATE OF CORRECTION

PATENT NO.     : 6,563,548 B1
DATED          : May 13, 2003
INVENTOR(S)    : Atsuo Shimada It is certified that error appears in the above-identified patent and that said Letters Patent is hereby corrected as shown below:

Column 3,
Line 38, "units one block" should read -- units of one block --.

Column 6,
Line 60, "claim 5" should be -- claim 9 --.

Signed and Sealed this

Twentieth Day of April, 2004

JON W. DUDAS
*Acting Director of the United States Patent and Trademark Office*